(12) United States Patent
Billeci et al.

(10) Patent No.: US 9,454,377 B2
(45) Date of Patent: Sep. 27, 2016

(54) SPECULATIVE BRANCH HANDLING FOR TRANSACTION ABORT

(71) Applicant: International Business Machines Corporation, Armonk, NY (US)

(72) Inventors: Michael Billeci, Tivoli, NY (US); James J. Bonanno, Wappingers Falls, NY (US); Adam B. Collura, Hopewell Junction, NY (US); Christian Jacobi, Poughkeepsie, NY (US); Anthony Saporito, Highland, NY (US); Timothy J. Siegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/052,090

(22) Filed: Feb. 24, 2016

(65) Prior Publication Data

US 2016/0239310 A1    Aug. 18, 2016

Related U.S. Application Data

(63) Continuation of application No. 14/621,513, filed on Feb. 13, 2015.

(51) Int. Cl.
*G06F 9/38* (2006.01)
*G06F 9/46* (2006.01)

(52) U.S. Cl.
CPC ............ *G06F 9/3844* (2013.01); *G06F 9/466* (2013.01); *G06F 9/467* (2013.01)

(58) Field of Classification Search
CPC ....... G06F 9/3844; G06F 9/466; G06F 9/467
USPC ........................................................ 712/239
See application file for complete search history.

(56) References Cited

U.S. PATENT DOCUMENTS

| 8,682,877 | B2 | 3/2014 | Greiner et al. |
| 8,887,002 | B2 | 11/2014 | Greiner et al. |
| 2013/0339703 | A1* | 12/2013 | Alexander ............ G06F 9/3861 712/244 |
| 2014/0059333 | A1 | 2/2014 | Dixon et al. |
| 2015/0347137 | A1* | 12/2015 | Gschwind ............... G06F 9/467 712/239 |

* cited by examiner

*Primary Examiner* — Andrew Caldwell
*Assistant Examiner* — Michael Metzger
(74) *Attorney, Agent, or Firm* — Cantor Colburn LLP; Margaret McNamara

(57) ABSTRACT

Embodiments relate to speculative branch handling for transaction abort. An aspect includes detecting a beginning of a current execution of a transaction. Another aspect includes, based on detecting the beginning of the transaction, disabling speculative execution based on branch prediction of an initial branch instruction of the transaction, wherein the initial branch instruction branches to two possible paths, and wherein a first path of the two possible paths comprises an abort handler. Another aspect includes disabling updating of a history table for the initial branch instruction.

1 Claim, 3 Drawing Sheets

SPECULATIVE BRANCH HANDLING FOR TRANSACTION ABORT

BACKGROUND

The present invention relates generally to transaction handling in a computing system, and more specifically, to speculative branch handling for transaction abort.

A transaction is a set of operations that transforms data from one state to another. A transaction typically includes a section of program code or a set of program instructions. In a transactional memory system, concurrent transactions are speculatively executed, and changes to data that are performed by non-conflicting transactions may be committed after completion. A conflict may occur when two or more concurrent transactions access similar pieces of data, such as word, block, object, etc. from a memory, and at least one memory access is a write access. When a transaction completes, the architectural changes made by the transaction are validated, and if validation is successful, the changes are made permanent, and the transaction is referred to as a committed transaction. If a transaction cannot be committed due to conflicts, the transaction is aborted, and any changes made by the execution of the instructions in the transaction are rolled back. The aborted transaction may then be re-executed from the beginning until the transaction succeeds.

A transactional memory system can be implemented in the form of hardware or software, or a combination of both. Hardware transactional memory systems include modifications to the processors, caches, and bus protocols to support transactions. Software transactional memory system provides transactional memory semantics in a software runtime library.

SUMMARY

Embodiments include a method, system, and computer program product for branch handling for transaction abort. An aspect includes detecting a beginning of a current execution of a transaction. Another aspect includes, based on detecting the beginning of the transaction, disabling speculative execution based on branch handling of an initial branch instruction of the transaction, wherein the initial branch instruction branches to two possible paths, and wherein a first path of the two possible paths comprises an abort handler. Another aspect includes disabling updating of a history table for the initial branch instruction.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
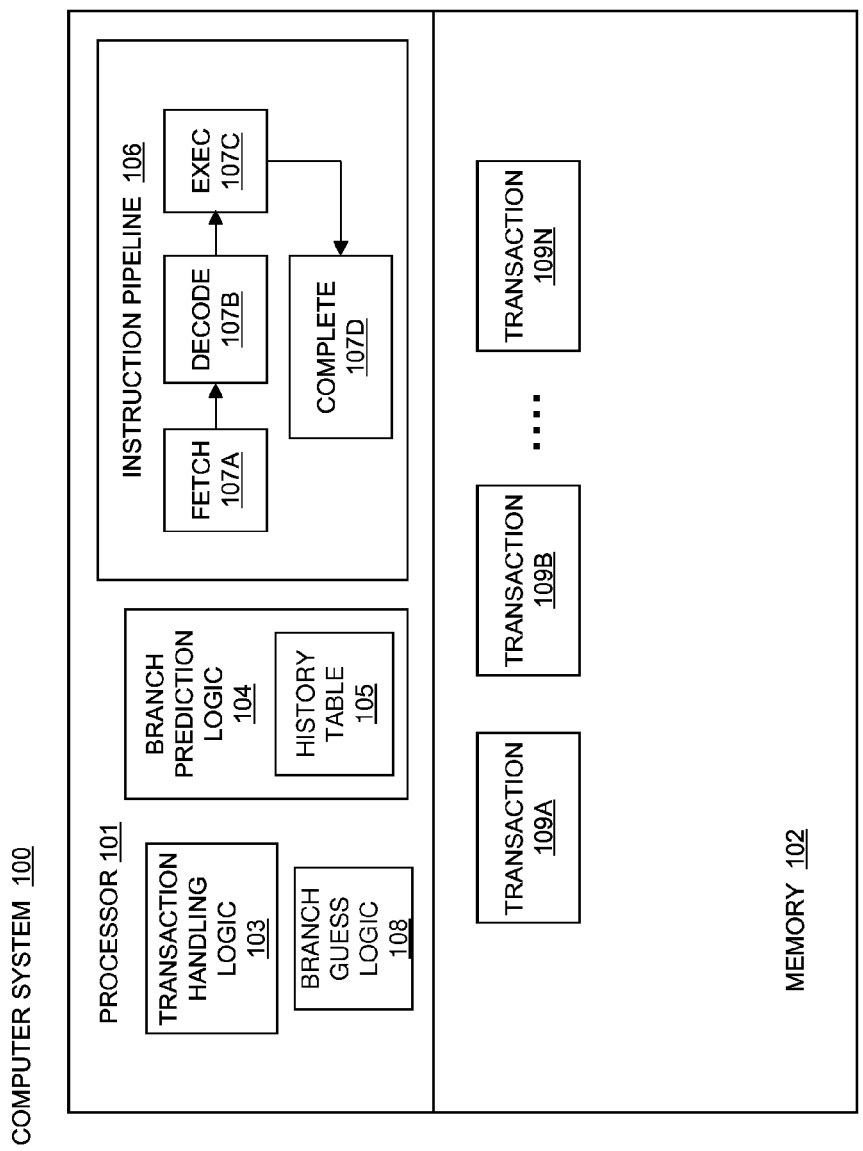
FIG. 1 depicts a computer system for speculative branch handling for transaction abort in accordance with an embodiment.

Embodiments of speculative branch handling for transaction abort are provided, with exemplary embodiments being discussed below in detail. In a lock elision transaction system, aborting of a transaction may cause the transaction to attempt to obtain a lock on a memory region that is used by the transaction in order to retry the operation non-transactionally in the event of repeated aborted transactions. The speculative obtaining of the lock may cause any other transactions that use the memory region to abort. Speculatively executing an abort for a transaction based on branch prediction may therefore cause the other transactions to abort, even if the speculative execution of the original transaction's branch is later rolled back. Therefore, speculative execution of transactional abort handlers, which may be triggered by, for example, branch prediction or pipeline early branch guessing, is avoided.

Parallel programming may use synchronizing locks to protect execution of critical sections of code. Transactional execution using lock elision can be beneficial when threads typically do not conflict, i.e., the threads either work on different parts of a critical section in parallel, or tend to not overlap at all. In lock elision, a given transaction makes sure a global lock isn't already set when the transaction begins, and aborts if the global lock is set during execution of the transaction. If the global lock is not set, the lock address is added to the transaction's read footprint, but the lock is not set. With no contention, all critical section work is performed and transactions end without any locking being performed by any of the transactions. If a data conflict occurs, the transaction aborts due to the transactional footprint being stored into by another process. For a transaction that has been aborted and retried repeatedly, a non-transactional abort handler may be invoked to obtain the lock in order to complete the transaction and make forward progress. However, obtaining the lock aborts other transactions based on their footprints, and prevents the aborted transactions from resuming until the work of the locking transaction is completed and the lock released. In speculative abort handler execution, the abort handler is viewed as part of the transaction, which can pollute the footprint of the transaction and make aborts more likely. For transactions that implement lock elision, an initial branch instruction, which may be a mask branch instruction, is evaluated to determine whether to invoke the abort handler and obtain the lock; however, the branch instruction may start execution of the abort handler speculatively based on branch prediction or early pipeline branch speculation of the direction of the branch instruction. The speculatively aborting transaction gets exclusive ownership of the lock, which in turn can abort other concurrent transactions since the lock address is part of their read footprint.

In an example of a speculative abort, an external interrupt may cause a random abort of a particular transaction. When the particular transaction aborts, other victim transactions may also abort due to speculative conventional lock acquisition by the particular transaction. The branch prediction logic updates the history table based on the abort for all of the transactions that abort, and speculatively directs execution to abort in the future for both the particular transaction and the victim transactions. Predicting and speculatively executing the abort handler based on the history table then causes the transactions to abort in the future, which strengthens the predictions in the history table, causing further aborts. One random abort may therefore cause the branch prediction logic to predict a branch to the abort handler on the next occurrence. A non-predicted but incorrect early pipeline guess for a branch to an abort handler can have the same effect.

The branch prediction logic may therefore be prevented from gathering or updating history on the conditional branch instruction that branches to, or around, the abort handler. Pipeline early branch guessing logic may also be prevented from triggering speculative execution of a transaction abort. This may be implemented in some embodiments by preventing installation of or blocking updates of entries in a branch history table for the conditional branch instruction, which may be located directly after the beginning of the transaction, e.g., TBEGIN. Some transactions may have the abort handler located in-line, while other transactions have the abort handler located out-of-line; this may be indicated by the value of the condition code mask of the conditional branch that either redirects program flow to the transaction or abort handler. For example, in an embodiment with a four value condition code (or mask), where a condition code value of "1000" (in binary) represents a non-aborted transaction and any other value represents an aborting scenario, the conditional branch to or around an abort handler representing an in-line or out-lined abort transaction can be identified as follows: an in-line abort transaction branches around the abort handler using a conditional branch with a mask of "1000" for a successful TBEGIN, whereas an out-lined abort transaction branches to the abort handler using a mask of "0111" for a failed or aborting TBEGIN. Therefore, for example, if the mask is "1000", an in-line abort type transaction may be indicated, and the branch prediction and early pipeline guess logic may be forced to only predict or guess the mask branch instruction as taken, avoiding speculative execution of the in-lined abort handler. In a further example, if the mask is "0111", an out-of-line abort transaction may be indicated, and the branch prediction and early pipeline guess logic is prevented from predicting or guessing the mask branch instruction as taken, avoiding speculative execution of the out-lined abort handler.

Turning now to FIG. 1, a computer system 100 for speculative branch handling for transaction abort is generally shown. Computer system 100 includes a processor 101 and a memory 102. The processor 101 includes a transaction handling logic 103, a branch prediction logic 104 that include a history table 105, an instruction pipeline 106, and pipeline early branch guessing logic 108. Instruction pipeline 106 includes a plurality of pipeline stages, including but not limited to a fetch stage 107A, a decode stage 107B, an execution stage 107C, and a completion stage 107D. During execution, instructions proceed sequentially through the pipeline stages 107A-D of the instruction pipeline 106. Branch prediction may be performed for a branch instruction based on history table 105 by the branch prediction logic 104 or by the pipeline early branch guessing logic 108, and the predicted path of a predicted branch may be speculatively executed at execution stage 107C. Branch prediction may be performed by the branch prediction logic 104 based on the history table 105 relatively early in the life cycle of a branch instruction; for example before the fetch stage 107A. When no prediction is made for a branch instruction by branch prediction logic 104, the pipeline early branch guessing logic 108 may predict the direction of the branch instruction around the decode stage 107B. Then, at completion stage 107D, the resolution of the branch is determined and it is determined whether the speculative execution of the branch instruction was correct. If the prediction was incorrect, the speculative execution of the predicted path of the branch is rolled back, and the correct path of the branch is executed based on the resolution. The history table 105 is updated based on the resolution of the branch (i.e., to indicate whether the branch was taken or not taken) for use in future predictions when the branch is encountered again. Computer system 100 may also execute a plurality of transactions 109A-N, which are handled by transaction handling logic 103. FIG. 1 is shown for illustrative purposes only; for example, a computer system may execute any appropriate number of transactions, and a pipeline may include any appropriate number and type of stages.

Figure 2:
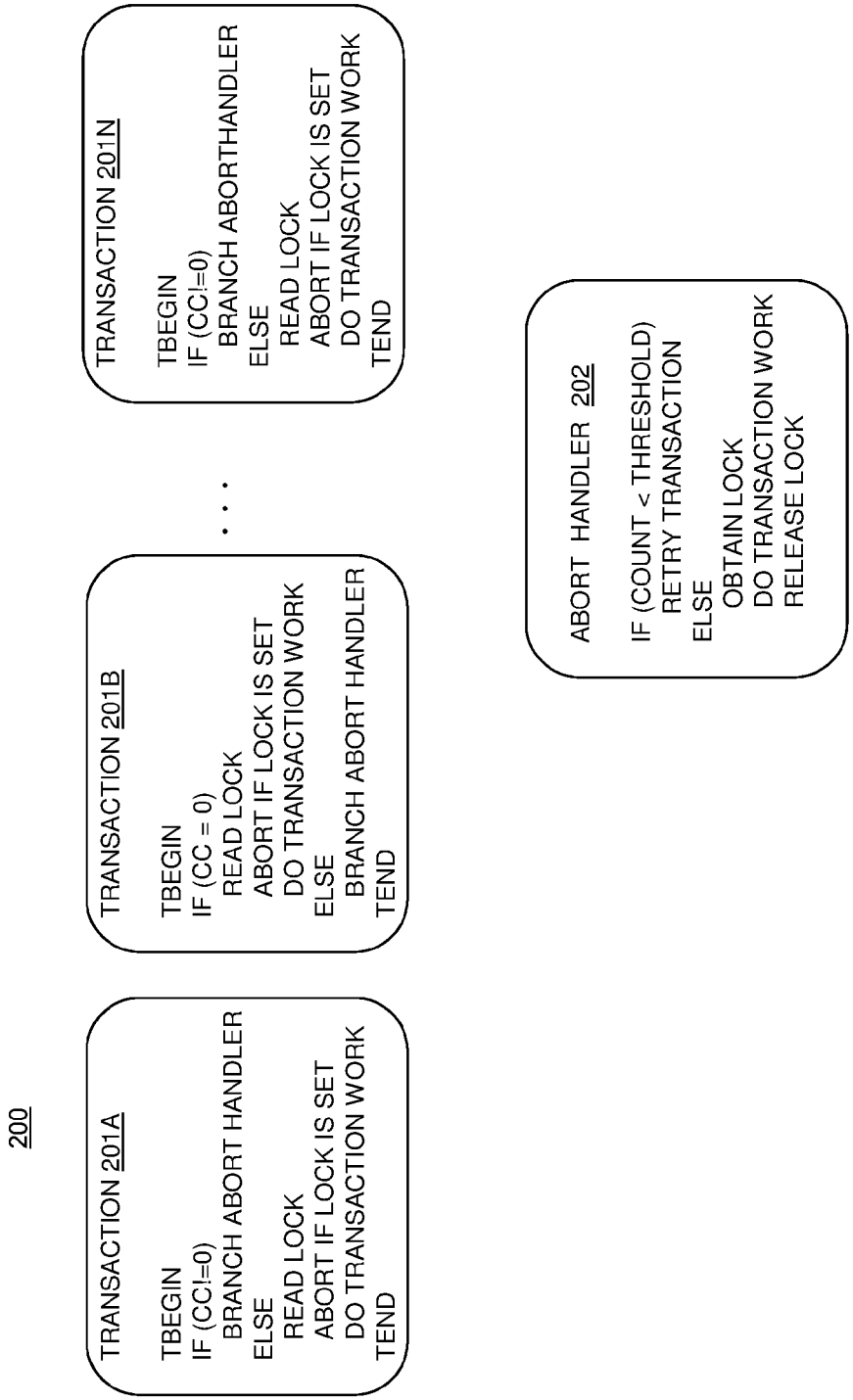
FIG. 2 depicts a plurality of transactions and an abort handler in accordance with an embodiment.

FIG. 2 illustrates an embodiment of a system 200 including a plurality of transactions 201A-N and an abort handler 202. Transactions 201A-N may comprise transactions 109A-N of FIG. 1. Transactions 201A-N comprise two out-of-line abort transactions 201A and N, and one in-line abort transaction 201B; however, these are shown for illustrative purposes only, a set of transactions in a system such as system 200 may include any appropriate number and type of transactions. Each of transactions 201A-N includes an initial branch instruction comprising a mask branch instruction that is located directly after the beginning of the transaction (e.g., TBEGIN) and that is based on the value of the mask of the transaction, which may also be referred to as a condition code (CC). The value of CC may be 0 if the transaction has not been aborted and retried before, while the value of CC may be non-zero if the transaction has been aborted and retried (i.e., if the current execution of the transaction is a retry execution). The mask may also indicate whether the transaction is an in-line abort or out-of-line abort transaction. In an out-of-line abort transaction such as transaction 201A, the branch abort command, which triggers abort handler 202, is performed if the mask branch instruction, "if (CC!=0)", is taken. In an in-line abort transaction such as transaction 201B, the branch abort command, triggering abort handler 202, is performed if the mask branch instruction, "if (CC=0)", is not taken.

Figure 3:
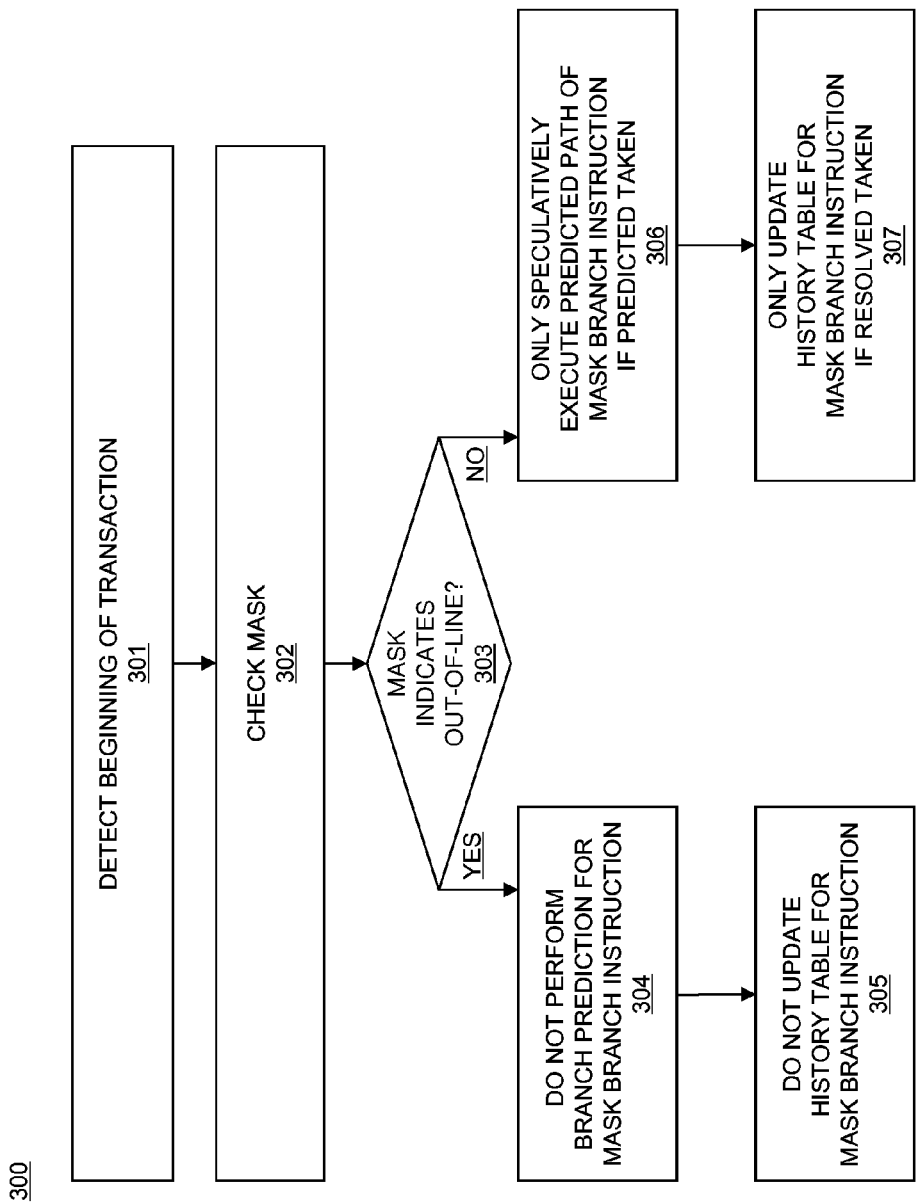
FIG. 3 depicts a process flow for speculative branch handling for transaction abort in accordance with an embodiment.

FIG. 3 illustrates an embodiment of a method 300 for speculative branch handling for transaction abort. FIG. 3 is discussed with reference to FIGS. 1 and 2. Method 300 may be implemented in transaction handling logic 103 in some embodiments. First, in block 301, the beginning of a transaction is detected by transaction handling logic 103 based on, for example, a TBEGIN instruction, such as is shown in transactions 201A-N of FIG. 2. Next, in block 302, the mask for the transaction is checked, and it is determined in block 303 whether the transaction is an out-of-line transaction (such as transaction 201A) or in-line transaction (such as transaction 201B). If it is determined in block 303 that the mask is indicates an out-of-line transaction, such as transaction 201A, the flow proceeds to block 304. In block 304, no branch prediction is performed by either of the branch prediction logic 104 or the pipeline early branch guessing logic 108 for the transaction's mask branch instruction (for example, "if (CC!=0)"), so as to prevent the mask branch instruction from being predicted taken and the branch abort instruction from being speculatively executed. Also, in block 305, the history table 105 is not updated based on the resolution of the mask branch instruction; i.e. if the mask branch instruction has an entry in the history table 105, that entry is not updated, or if the mask branch instruction does not have an entry in the history table 105, no new entry is created for the mask branch instruction.

If it is determined in block 303 that the mask is indicates an in-line transaction, such as transaction 201A, the flow proceeds to block 306. In block 306, branch prediction for the transaction's mask branch instruction (for example, "if (CC=0)") is performed by, for example, the branch prediction logic 104 or the pipeline early branch guessing logic 108, but the predicted path of the mask branch instruction is only speculatively executed if the mask branch instruction is predicted taken, so as to prevent the branch abort instruction from being speculatively executed. In some embodiments of block 306, the branch prediction logic 104 or the pipeline early branch guessing logic 108 may be forced to predict the mask branch instruction as taken based on determining that the transaction is an in-line transaction in block 303. Also, in block 307, the history table 105 is only updated based on the resolution of the mask branch instruction if the mask branch instruction is resolved as taken. Otherwise, if the mask branch instruction is resolved not taken, the history table 105 is prevented from being updated based on the resolution of the mask branch instruction; i.e. if the mask branch instruction has an entry in the history table 105, that entry is not updated, or if the mask branch instruction does not have an entry in the history table 105, no new entry is created for the mask branch instruction.

Technical effects and benefits include avoiding of speculative execution of transaction abort in a transactional memory system.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for branch handling for transaction abort, the method comprising:
   detecting a beginning of a current execution of a transaction, the transaction being one of a plurality of transactions in a lock elision transaction system;
   based on detecting the beginning of the transaction:
      disabling speculative execution based on branch prediction of an initial branch instruction of the transaction,
      determining whether the transaction is an out-of-line abort type transaction or an in-line abort type transaction,
      wherein the initial branch instruction branches to two paths, wherein the initial branch instruction comprises a mask branch instruction that is evaluated based on a condition code of the transaction, the condition code indicates whether the current execution of the transaction is a retry after abort, wherein a first path of the two paths comprises an abort handler, a second path of the two paths comprises a work section of the transaction, and wherein the abort handler sets a lock for the transaction,
      wherein based on the in-line abort type transaction being determined, the abort handler is executed if the mask branch instruction is not taken, and only speculatively executing the mask branch instruction based on the mask branch instruction being predicted taken to prevent a branch abort instruction from being speculatively executed,
      wherein based on an out-of-line abort type transaction being determined, the abort handler is executed based on the mask branch instruction being taken;
   disabling updating of a history table for the initial branch instruction based on the mask branch instruction being resolved as not taken; and
   updating the history table for the initial branch instruction based on the make mask branch instruction being resolved as taken.

* * * * *